June 28, 1932.  Z. POLAIRE  1,865,044
TRAP
Filed Jan. 17, 1931
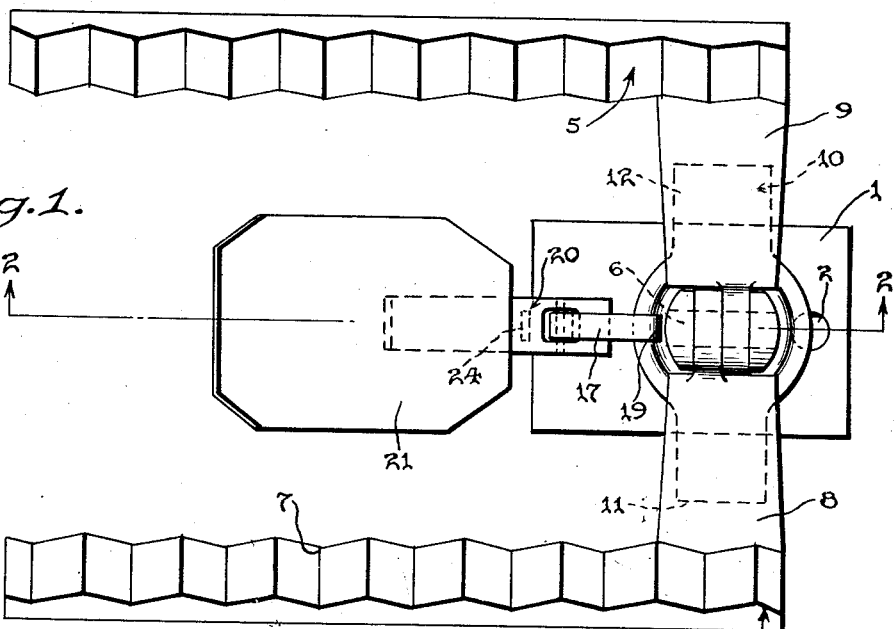
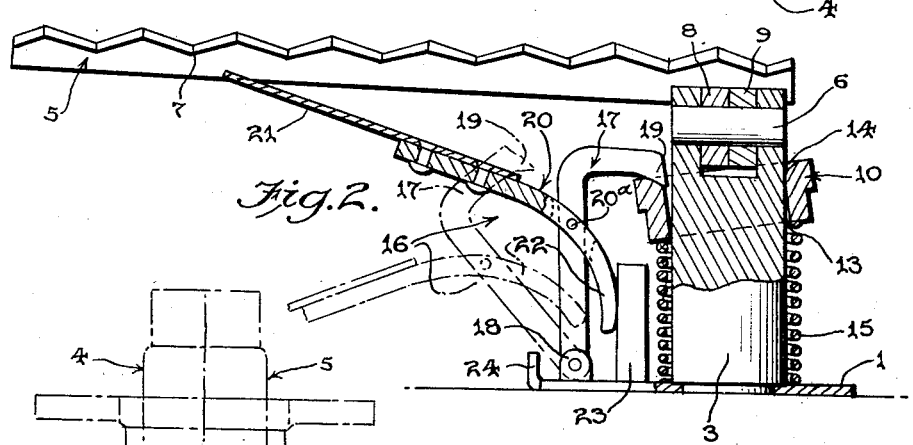
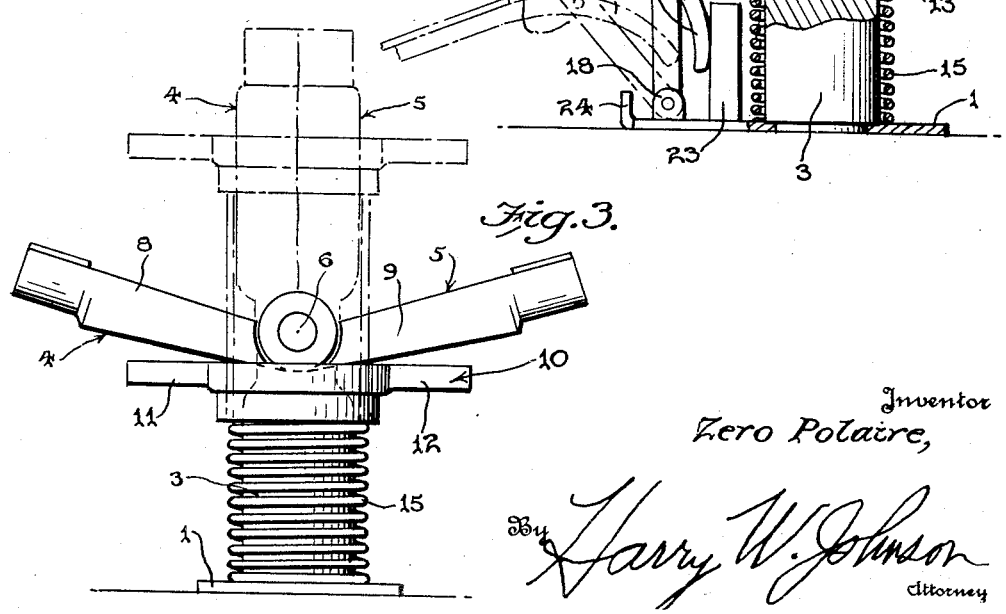
Inventor
Zero Polaire,
By Harry W. Johnson
Attorney Patented June 28, 1932

1,865,044

UNITED STATES PATENT OFFICE

ZERO POLAIRE, OF SALEM, OREGON

TRAP

Application filed January 17, 1931. Serial No. 509,438.

My invention relates to traps, more particularly to traps used for snaring and holding wild game, and it consists in the combinations, constructions, and arrangements herein shown and described.

It is well known to trappers, hunters, and the like, who engage in trapping wild game, that the traps in current use are often prematurely sprung by forces exerted thereon by storms, falling objects, moving animals, and other disturbances which create vibrations in the parts of the trap, thus rendering the same inoperative for the purpose of capturing the game for which it is designed. It is therefore a primary purpose of my invention to provide a trap the parts of which are so arranged that the same will normally not trip, except upon the proper operation thereof by the animal for whose retention it is designed.

A still further object of my invention is to provide a trap of the jaw type in which the tripping mechanism is so arranged in relation to the jaws that the imprisonment of the animal will surely result from his actuation of said tripping mechanism.

A still further object of my invention is to provide a trap of the jaw type, the teeth of which jaws when the trap is out of use will interfit in such a fashion that they will not be broken, chipped, or otherwise mutilated due to jars or other vibrations to which they may be subjected during transportation from one point to another.

A still further object of my invention is to provide a trap of the type described which has few parts, is simple to manufacture, and does not get out of order easily.

Other objects and advantages will appear as the specification proceeds, and the invention will be more particularly defined in the appended claims.

My device is illustrated in the accompanying drawing forming a part of this application, in which Figure 1 is a top plan view of my device when set up for operation, Figure 2 is a sectional view on line 22 of Figure 1, with certain of the parts shown in dotted lines and another operative position, and Figure 3 is a full and dotted line elevational view showing the parts in two operative positions.

In carrying out my invention I make use of a base plate, 1, provided with an aperture, 2, through which suitable fastening means of any nature may be applied for securing the trap to a piece of timber, a tree, to the ground, or to other suitable means as desired by the operator.

Projecting upwardly from this base plate, 1, is a post, 3, which serves as a support for the jaws, 4 and 5. These jaws, 4 and 5 are hinged to said post as indicated at 6.

The jaws, 4 and 5, each consist of an L-shaped member, having a pivot point positioned at the extremity of the base of the L, as indicated at 6, and having the portions thereof corresponding to the outstanding portions of the L provided with teeth, indicated at 7. These teeth are so arranged that they come together into interfitting relationship when the jaws are closed, thereby preventing relative motions between the jaws when the same are in a closed position, with consequent prevention of chipping, wearing, or otherwise mutilating said teeth. This arrangement further serves to relieve the hinged parts at 6 from undue stress and strain.

For engagement with the portions, 8 and 9, of the jaw members, 4 and 5, for forcing them into the closed position, a collar, 10, is provided, which collar is fitted to embrace the post, 3, as well as the parts, 8 and 9, when in vertical extended position to hold the jaws in closed position. This collar, 10, is equipped with a pair of ears, 11 and 12, for engagement by the hands of the operator during the setting operation. The upper portion of the collar is depressed towards the aperture, 13, thereof, as indicated at 14, throughout its entire annular extent, for better engagement with the tripping mechanism, as will soon be set forth.

For normally urging the collar into the trap-closing position, a compression spring, 15, is positioned between said collar, 10, and the base plate, 1. This compression spring, 15, may be of any desired size and strength suitable to the amount of force it is desired to exert upon the closing jaws.

For maintaining the trap in the set position with the actuating spring under compression, a trip mechanism, generally indicated at 16, is provided. This trip mechanism comprises an L-shaped lever, 17, pivoted at 18, on the base plate, 1, and provided with a downward extending lip, 19, at its outer extremity for engagement with the recessed or depressed portion, 14, of the collar, 10. When this member is positioned as shown in Figure 2, the pressure exerted by the spring, 15, will maintain said lever, 17, in engagement with the collar, 10, thereby allowing the jaws to remain in the open position.

For operating this trip or trigger member, 17, into the released position by the animal it is desired to capture, this trigger member, 17, is provided with a curved lever, 20, pivoted as indicated at 20a thereto, which is equipped at one end with a suitably formed bait supporting platform, 21, upon which the bait is placed for enticing the animal into engagement with said platform, 21, for actuation of the tripping mechanism. The curved end, 22, of this lever, 20, abuts a stop member, consisting of a post, 23, which is mounted on the base, 1, as shown most clearly in Figure 2.

For preventing overthrow of the tripping mechanism with consequent damage thereto when the trap is "snapped" the plate 1, is further provided with a stop member, 24, which engages the member, 17, upon operation of the trap.

From the foregoing description, the use and operation of my invention is easily understood. When it is desired to set the trap, the operator simply engages with his thumbs the ears, 11 and 12, of the collar, 10, and forces the same downwardly upon the post, 3, depressing the spring until the collar member, 10, is positioned below the trigger lever, 17, at which time he draws the lever 17 inwardly until its lip, 19, engages in the annular depression, 14, in the collar. The jaws upon this operation will fall laterally to the open position shown in Figures 1 and 2, and in the full line view of Figure 3. He may then place the bait on the supporting platform, 21, if he has not already done so. If the trap is not to use bait, but is to be positioned in the runs or trails used by animals for engagement with the foot or other portion of said animal, he may not use any bait at all.

When the parts are thus positioned, the engagement of a portion of the animal with the platform, 21, will depress said member, which depression will actuate the portion, 22, of lever, 20, against the stop member, 23, the reaction from which force will actuate lever, 17, outwardly or to the left from the position shown in Figure 2. This movement of the lever, 17, will cause a disengagement of the lip, 19, from the annular recessed portion, 14, and a consequent release of the energy stored in the compression spring, 15, Upon release of this energy and the extension of said spring, the collar, 10, will be forced upwardly from the full line position shown in Figure 3, to the dotted line position shown also in said figure, to snap the jaws into engagement about the portion of the animal actuating the tripping mechanism. The parts of the tripping mechanism will then take on the dotted line position shown in Figure 2.

It is easily understood that the lip, 19, engaging with the depressed portion, 14, of the collar, 10, will secure said parts against actuation in the presence of normal vibrations imparted to the mechanism, and will allow operation only upon the engagement of a portion of the animal with the platform, 21, in the manner described. It is further seen that, because of the arrangement of the teeth on the jaws, stresses and strains will be removed from the hinges of the same, thereby greatly prolonging the life of the apparatus.

It is thus seen that I have provided a device of the type described which has few parts, operates efficiently, and is well adapted for long use.

What I desire to claim and secure by Letters Patent is:

1. In a trap, a pair of jaws, resilient means for actuating said jaws, an annular member having an annular depression therein, a lever having a depending portion for engagement with said annular member in said depression for maintaining said resilient means under pressure, and tripping means for operating said retaining means to the released position upon actuation by an animal.

2. In a trap, a pair of jaws, resilient means for operating said jaws to the closed position, a member for engagement with the hands of an operator for compressing said resilient means to the inoperative position, said member having a depression therein, a trigger member having a depending lip extending from its extremity for engagement with said depression, and tripping means for removing said trigger member from said depression for releasing said spring compression means for operation of the trap.

3. In a trap, a pair of jaws, resilient means for operating said jaws to the closed position, means for engagement with the hands of an operator for compressing said resilient means, a lever having a projecting member for engagement with said compressing means, for holding the said resilient means under compression, and means for moving said lever to operate the trap, comprising a curved lever having a portion for engagement by an animal pivoted to said lever, and a stop member for engagement with the curved portion of said second-named lever.

4. In a trap, a trigger for the operation thereof, comprising a lever having a portion for engagement with the operating member of said trap, a stop member adjacent said lever, and a second lever pivoted to said first-named lever, having a portion for engagement by an animal and a portion for engagement with said stop member for forcing said first-named lever out of engagement with the operating member upon contact with the animal.

5. In a trap, a spring-pressed member for closing the jaws, a member for holding said spring-pressed member against the force of said spring, and means for positively withdrawing said holding member from said spring-pressed member for actuation of the trap.

6. In a trap, a pair of jaws, spring pressed means for operating said jaws to the closed position and for actuation by an operator against the pressure of the spring, a detent for engagement with said spring pressed means, and tripping means for actuation by an animal to withdraw said detent from said spring pressed means for actuation of the trap, comprising a curved lever pivoted to said detent, a stop member for engagement with the curved portion of said lever, and a second stop member for preventing overthrow of said tripping mechanism.

ZERO POLAIRE.